(12) United States Patent
Suzuki et al.

(10) Patent No.: US 6,195,271 B1
(45) Date of Patent: Feb. 27, 2001

(54) AC ADAPTOR WITH POWER CONSUMPTION REDUCTION IN UNUSED STATE

(75) Inventors: Keiji Suzuki, Fujisawa; Hideto Horikoshi, Sagamihara, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/295,932

(22) Filed: Apr. 21, 1999

(51) Int. Cl.[7] .......................... H02M 3/335; H02M 7/44; H02M 7/68
(52) U.S. Cl. ................. 363/20; 363/20; 363/97; 363/131
(58) Field of Search ................. 363/20, 21, 95, 363/97, 131; 320/163

(56) References Cited

U.S. PATENT DOCUMENTS

| | | | |
|---|---|---|---|
| 4,675,796 | * 6/1987 | Gautherin et al. | 363/20 |
| 5,363,323 | * 11/1994 | Lange | 363/21 |
| 5,424,932 | * 6/1995 | Inou et al. | 363/21 |
| 5,448,465 | * 9/1995 | Yosida et al. | 363/21 |
| 5,627,740 | * 5/1997 | Johari | 363/21 |
| 5,781,421 | * 7/1998 | Steigerwald et al. | 363/21 |
| 5,793,621 | * 8/1998 | Yamada | 363/21 |
| 5,796,595 | * 8/1998 | Cross | 363/21 |
| 5,801,514 | * 9/1998 | Saeki et al. | 320/136 |
| 5,872,704 | * 2/1999 | Kim | 363/20 |
| 5,905,361 | * 5/1999 | Saeki et al. | 320/119 |
| 6,008,629 | * 12/1999 | Saeki et al. | 320/140 |

* cited by examiner

Primary Examiner—Peter S. Wong
Assistant Examiner—Bao Q. Vu
(74) Attorney, Agent, or Firm—Bernard Bogdon; Andrew Dillon

(57) ABSTRACT

An AC adaptor that can reduce power not in use state, and a battery-operated electronic apparatus that can employ such an AC adaptor. An AC adaptor includes, (a) an input line along which an external AC voltage is input, (b) a first transformer for transforming the input AC voltage into a DC voltage at a first voltage level, (c) a switch provided on the primary side of the first transformer, (d) an output line along which a DC voltage on the secondary side of the first transformer is output externally, (e) a second transformer for transforming the input AC voltage into a DC voltage at a second voltage level that is higher than the first voltage level and for outputting the resultant DC voltage to the output line, and (f) an AC adaptor operation control circuit for comparing a voltage level across the output line with a reference voltage level, which is higher than the first voltage level and which is lower than the second voltage level, and for turning on the switch when the voltage level across the output line is lower than the reference voltage level, or for turning off the switch when the voltage level across the output line exceeds the reference voltage level. When an electronic apparatus does not require supply of power, the AC adaptor is detached from the system load in the apparatus, so that the voltage across the output line of the AC adaptor exceeds the reference voltage. In response to the result of the comparison, the switch on the primary side of the first transformer is turned off, and thus the operation of the first transformer can be halted.

5 Claims, 3 Drawing Sheets

AC ADAPTOR WITH POWER CONSUMPTION REDUCTION IN UNUSED STATE

RELATED PATENT FILING

This patent document is cross referenced to assignee's related patent document Ser. No. 09/195,815.

FIELD OF THE INVENTION

The present invention relates to an AC adaptor for transforming a commercially available AC voltage into a DC voltage and to a battery-operated electronic apparatus that can employ such an AC adaptor, and in particular to an AC adaptor for which power can be reduced in the unused state and to a battery-operated electronic apparatus that can employ such an AC adaptor. More specifically, the present invention pertains to an AC adaptor for which power consumption can be reduced in the unused state by detecting the state of a power source in an electronic apparatus connected thereto, and to a battery-operated electronic apparatus that can employ such an AC adaptor.

BACKGROUND OF THE INVENTION

In accordance with recent technical developments, various types of personal computers, such as desktops, towers and notebooks, are being produced and sold. Notebook computers, designed for outdoor use while taking into consideration the mobility and portability, are compact and light. A typical example of such a notebook computer is the "IBM ThinkPad 770" series sold by IBM Japan, Co., Ltd ("IBM ThinkPad 770" is a trademark of IBM Corporation).

Almost all the notebook PCS can be operated by incorporated batteries because this type of PC can even be employed in a mobile environment where AC power is not available. An incorporated battery is provided as a "battery pack" in which are stored a plurality of rechargeable battery cells, such as Li-Ion, NiCd or NiMH battery cells.

While the capacity of an AC power source is generally considered to be unlimited, the capacity of the battery pack is always limited and its operating period is short (usually, at most, two to three hours), and an extended period of time is required to recharge it (generally, the time required for charging is the equivalent of the operating period for the battery). A user can carry a spare battery to extend the effective battery operating period; however, since a spare battery is inconvenient, heavy and bulky, portability is degraded. Therefore, in an office environment where AC power is available, an external AC adaptor is connected to a notebook computer to drive it using the AC power. The AC adaptor is a device for transforming an AC voltage into a DC voltage, and includes a rectifier and a transformer for transforming the level of a DC voltage, which is well known. A cable extending from one end of an AC adaptor is inserted into an AC outlet (normally built into a wall in a room), and another cable extending from the other end of the AC adaptor is inserted into a DC inlet in the case of a notebook PC. Power output by the AC adaptor is used to drive the apparatus, as is described above, and extra power or power supplied in the power-off state is used to recharge an incorporated battery.

Recent notebook PCS are capable of replacing desktops, i.e., can serve as "desktop replacements." This is because, as the semiconductor fabrication techniques have been developed, the processing capabilities of notebook computers have been improved until they are equivalent to those of desktop PCS, and also because the size of an LCD panel screen and the number of drive units have been increased and the working environment for notebook PCS is as excellent as is that for the desktop PCS. In addition, since a notebook PC has a smaller volume and a small footprint, installation space in an office environment can be saved.

When a notebook PC is used only in an office, an AC power source is employed, as is described above. In most cases, a notebook PC that is used in this manner is constantly connected to an AC outlet, even when it is not in use (e.g., at night and on holidays). However, when the apparatus is in the power OFF state or the AC adaptor is removed from the apparatus, the AC adaptor connected to the AC outlet continues to be conductive, so that a problem arises concerning power consumption during this period. While an AC adaptor includes a transformer for transforming a DC voltage, control, using an analog switch such as an FET switch, is performed on the primary coil side of the transformer in order to stabilize the voltage output. Regardless of whether a PC is powered off or the AC adaptor is removed from the PC, so long as the AC adaptor is inserted into the outlet and is receiving AC power, the switching control is constantly performed. That is, power consumed by the AC adaptor is mainly that required by the switching control. In addition, since most of the power loss is converted into thermal energy, a countermeasure is also required that will disperse heat from the AC adaptor.

The following is a calculation of the power consumed by an AC adaptor not in use. As an example, a current resonant AC adaptor, which is used for a typical notebook PC, the "IBM ThinkPad" series, consumes 2 to 4 W of power because of switching loss, even when the PC is in the power off state, and a "flyback" AC adaptor consumes 0.5 to 1 W of power. Generally, since current resonant AC adaptors have superior voltage conversion efficiency, they tend to be used instead of the flyback AC adaptors, even though when not in use, the power loss for the current resonant type is greater. Further, since even inside a PC a DC voltage (e.g., 16 V) is constantly applied by an AC adaptor, approximately 0.5 W of power is consumed in the power off state. Although the power loss attributable to a single PC is relatively minute, being approximately 3 W, at an office wherein a large number of PCS are installed, merely by keeping AC adopters attached to AC power sources, a considerable charge for electricity can be accrued.

Assuming that the period of time during which PCS are not used at night on weekdays is 12 hours, and that the period of time during which PCS are not used on weekends is 60 hours. The total time in a year that a PC is not used is 1,280 hours/year (=12 hours/day×200 days/year+60 hours/week×4 weeks/month×12 months/year). Therefore, if there were one million notebook PCS connected to AC adopters, the accompanying annual power loss would be 15,840,000 KWh/year (=1,000K units×1,280 hours/year×3 W), and assuming, e.g., the charge for electricity is 239,184K yen (=0.0151K ¥/KWh/year×15,840,000 KWh/year).

Since an AC power source is unlimited, from the standpoint of supplying power for driving PCS, practically no problems exist. However, when consideration is given to the sociobiological aspect, i.e., from the viewpoint of the effective use of resources and of environmental protection globally, such a power loss as that attributable to the AC adaptors that are not in use state can not be ignored.

In order to eliminate the loss of power at an AC adaptor not in use state, it is preferable that the AC adaptor be detached from an outlet and a notebook PC each time after it has been used. However, the connection and the disconnection of cables are burdensome tasks, and they contribute to the deterioration of usability. In addition, the frequent disconnection of an AC adaptor accelerates the wear and tear experienced by an outlet and the plug of an AC adaptor. And also, since a notebook PC recharges its incorporate battery using power supplied in the power-off state, a user must keep an AC adaptor attached.

Another method may be employed whereby in a state where the output from the AC adaptor is unnecessary (i.e., a period during which the main box of a PC is powered off and is not being recharged) a signal to this effect is output by a notebook PC, and upon the receipt of this notice, the AC adaptor cuts off power to the primary coil side of the transformer. In IBM Technical Disclosure Bulletin No. JA8-97-0299, for example, there is disclosed an invention that embodies a method for adding a new signal line along which a notebook PC transmits the power supply state signals to an AC adaptor to halt the operation of the AC adaptor. However, the addition of a signal line is accompanied by a loss of the connection compatibility at a DC inlet that connects the PC and the AC adaptor. In other words, the notebook PC according to IBM TDB JA8-97-0299 accepts only the AC adaptor that is described in that disclosure. Also, this AC adaptor can be employed only for that notebook PC according to IBM TDB JA8-97-0299.

A technique for avoiding power loss due to an AC adaptor when an apparatus is not in use is disclosed in Japanese Unexamined Patent Publication Nos. Hei 6-292362, Hei 4-165957, Hei 7-153582 and Hei 8-179858. However, since in Japanese Unexamined Patent Publication No. Hei 6-292363 a battery in the apparatus is used to turn on the primary side switch of an AC adaptor, the operation of the AC adaptor can not be halted if there is no battery incorporated in the apparatus or if there is no power remaining in an incorporated battery.

The invention disclosed in Japanese Unexamined Patent Publication No. Hei 4-165957 detects the presence of a load current in an AC adaptor to control the on/off state of the AC adaptor. Therefore, when an apparatus that has no incorporated battery is powered on, the AC adaptor can not detect a change (or an event) in the state wherein the supply of power should be initiated. That is, there occurs a contradiction that affects the AC adaptor and prevents it from being turned on again.

In Japanese Unexamined Patent Publication No. Hei 7-153582 there is disclosed a power saving technique for an AC adaptor used for luminaries. In this publication, the AC adaptor is integrally formed with a luminary, and the power saving technique for an AC adaptor that is connected to the main box of an apparatus is not taught.

In Japanese Unexamined Patent Publication No. Hei 8-179858, a power switch is provided for an AC adaptor. When this power switch is manually operated, the AC adaptor can be turned on and off, without removing the AC adaptor from an AC outlet. However, the AC adaptor can not be turned off automatically. For example, it is impossible for the AC adaptor to be turned off automatically in response to completion of the recharging process for the apparatus in the power-OFF state.

SUMMARY OF THE INVENTION

It is one object of the present invention to provide a superior AC adaptor for transforming an AC voltage into a DC voltage, and a battery-operated electronic apparatus that can employ such an AC adaptor. It is another object of the present invention to provide a superior AC adaptor that can reduce power in the not in use state, and a battery-operated electronic apparatus that can employ such an AC adaptor. It is an additional object of the present invention to provide a superior AC adaptor for which power consumption can be reduced in the unused state by detecting the condition of the power supply in an electronic apparatus that is connected to the AC adaptor, and a battery-operated electronic apparatus that can employ such an AC adaptor.

To achieve the above objects, according to a first aspect of the present invention, an AC adaptor for transforming an AC voltage into a DC voltage includes an input line along which an external AC voltage is input, an AC/DC transformer for transforming the input AC voltage into a DC voltage, an output line along which the resultant DC voltage is output externally; and means for monitoring a voltage level across the output line and for halting an operation of the AC/DC transformer when the voltage level exceeds a predetermined value.

According to a second aspect of the present invention, an AC adaptor for transforming an AC voltage into a DC voltage includes an input line along which an external AC voltage is input; an AC/DC transformer for transforming the input AC voltage into a DC voltage, an output line along which the resultant DC voltage is output external, and means for monitoring a voltage level across the output line and for detaching the input line from the AC/DC transformer when the voltage level exceeds a predetermined value.

According to a third aspect of the present invention, an AC adaptor for transforming an AC voltage into a DC voltage includes (a) an input line along which an external AC voltage is input, (b) a first transformer for transforming the input AC voltage into a DC voltage at a first voltage level, (c) a switch provided on the primary side of the first transformer, (d) an output line along which a DC voltage on the secondary side of the first transformer is output externally, (e) a second transformer for transforming the input AC voltage into a DC voltage at a second voltage level that is higher than the first voltage level, and for outputting the resultant DC voltage to the output line, and (f) an AC adaptor operation control circuit for comparing a voltage level across the output line with a reference voltage level, which is higher than the first voltage level and which is lower than the second voltage level, and for turning on the switch when the voltage level across the output line is lower than the reference voltage level, or for turning off the switch when the voltage level across the output line exceeds the reference voltage level.

According to a fourth aspect of the present invention, an electronic apparatus, which can be operated by at least either one of a DC voltage from an AC adaptor and a DC voltage from a battery, includes means for determining whether the electronic apparatus requires an external power source, and means for detaching an input line of an AC adaptor from the electronic apparatus when the electronic apparatus does not require an external power source.

According to a fifth aspect of the present invention, an electronic apparatus, which can be operated by at least either one of a DC voltage from an AC adaptor and a DC voltage from a battery, includes an input line along which is fed a DC voltage from the AC adaptor, a power switch for instructing that a power source be turned on and off, a system load for consuming the DC voltage from the AC adaptor and the DC voltage from the battery, a charging controller for controlling a charged state of the battery, and means for monitoring the ON/OFF state of the power source and the recharged state of the battery and for detaching the input line from the outside when the power source is turned off and when the battery is not to be recharged.

According to the present invention, the AC adaptor includes the first transformer, for transforming an AC voltage from an external AC power source into a DC voltage to be supplied to an electronic apparatus, and the second transformer for transforming the external AC voltage into another DC voltage. These DC voltages are supplied to the output line. The DC voltage output by the first transformer is set to the first voltage level, and the DC voltage output by the second transformer is set to the second voltage level. The second voltage level is higher than the first voltage level. The first transformer serves as the main power source for the electronic apparatus, and the second transformer serves as an auxiliary power source having a small capacity.

The first transformer generates a power voltage required for the operation of a secondary power supply system that serves as a load. Generally, a switching control is constantly performed on the primary side in order to maintain a constant output voltage as is well known. Power is consumed for this switching control. According to the present invention, another switch is provided on the primary side of the first transformer in order to halt the inflow of a current from an external AC power source.

When the secondary power supply system that serves as a load is not activated, and charging is not performed, the second transformer supplies a power voltage to only one part of the circuit for the ON/OFF control of the power source. Only a low voltage need be output by the second transformer, i.e., only a small power supply capability is required (e.g., about 10 mA). Therefore, the second transformer can be a simple transformer coupler and a current circuit. Further, unlike the first transformer, power produced by the second transformer is not consumed by the switching operation. Since the amount of a current to be handled is extremely small compared with that for the first transformer, even when a switching type is employed for the second transformer, the power consumed by the switching operation on the primary side of the second transformer will be extremely small.

The output voltage level of the AC adaptor is constantly compared with the reference voltage. The reference voltage is set to a value that is higher than the first voltage level and is lower than the second voltage level. When the electronic apparatus to which the AC adaptor is attached, is in the ON state (including when the battery is being recharged while the power is off), a electric charge is pulled in by the system load in the apparatus, so that the voltage across the output line of the AC adaptor will go lower than the reference voltage. In response to the result of a comparison, the switch on the primary side of the first transformer is turned on, and the AC adaptor is driven. That is, the DC voltage can be supplied by the first transformer.

When an electronic apparatus attached to an AC adaptor is powered off and the charging of a battery is not performed, the output line of the AC adaptor is detached from the system load in the apparatus (i.e., is in the open state) and the supply of a current from the second transformer is enabled, so that the voltage across the output line of the AC adaptor exceeds the reference voltage. In response to the result of the comparison, the switch on the primary side of the first transformer is turned off, and thus the operation of the first transformer can be halted. Therefore, since the consumption of power that accompanies the switching operation at the first transformer is eliminated, the power consumed can be reduced, even when the AC adaptor is connected to the outlet of the AC power source and to the apparatus.

The AC adaptor determines the power supplied state of the apparatus (i.e., determines whether the power is on or the battery is being charged) in accordance with the voltage level at the output line of the AC adaptor. In other words, since the number of signal lines need not be increased for a power saving operation, the connector compatibility of the AC adaptor can be maintained.

The electronic apparatus of the present invention detaches the input line of the AC adaptor when it does not require an external supply of power. As for the AC adaptor, since the output side is opened (or, is set to a high-impedance state), the voltage level at the output line exceeds the reference voltage level and the operation of the first transformer can be halted. That is, the power reduction operation in the AC adaptor is ensured.

In short, when the AC adaptor according to the present invention is employed for an electronic apparatus, power consumption by the AC adaptor while the power to the apparatus is off can be restricted without detaching the AC adaptor from the DC inlet and the AC outlet.

Advantages of the Invention, as is described herein, according to the present invention include a superior AC adaptor for transforming an AC voltage into a DC voltage, and a battery-operated electronic apparatus that can employ such an AC adaptor. Further, according to the present invention, provided are a superior AC adaptor that can reduce power not in use state, and a battery-operated electronic apparatus that can employ such an AC adaptor. In addition, according to the present invention, provided are a superior AC adaptor that detects the power supply condition of an electronic apparatus attached to the AC adaptor, and a battery-operated electronic apparatus that can employ such an AC adaptor.

Other objects, features and advantages of the present invention will become apparent during the course of the following detailed description of the preferred embodiment, given while referring to the accompanying drawings.

DETAILED DESCRIPTION OF THE PREFERRED EMBODIMENT

Figure 1:
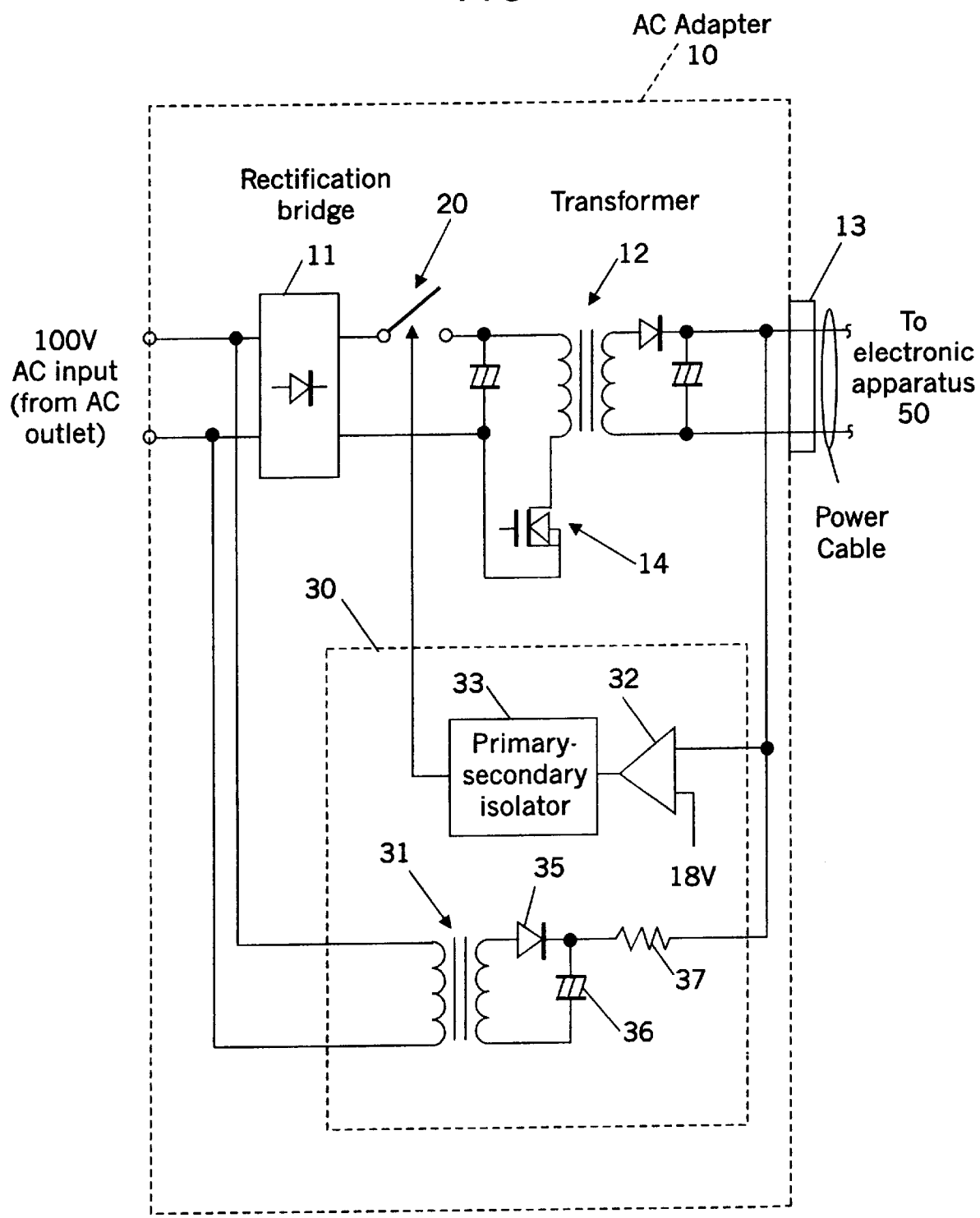
FIG. 1 is a schematic diagram illustrating a power supplying system for an AC adaptor and an electronic apparatus appropriate for the present invention.

The preferred embodiment of the present invention will now be described in detail while referring to the drawings.

A. Hardware Block Diagram

In FIG. 1 is shown an AC adaptor 10 appropriate for the present invention. The AC adaptor 10 in this embodiment transforms an AC voltage of 100 V received from an AC outlet into a DC voltage of 16 V, and supplies the DC voltage to an electronic apparatus 50 via a DC outlet 13. In order to implement AC-DC converter function, the AC adaptor 10 includes a rectification bridge 11, for rectifying and smoothing an AC voltage, and a transformer 12 for transforming an AC voltage into a DC voltage at a predetermined level (16 V in this embodiment). The output of the transformer 12 is the main power for the electronic apparatus 50.

The primary side of the transformer 12 is connected to the rectification bridge 11, and the secondary side is connected to the electronic apparatus 50 via the DC outlet 13. An analog switch 14 is inserted into the line leading to the primary side of the transformer 12, and when the analog switch 14 is turned on or off, the supply of a current to the transformer 12 is controlled. The feedback control of the analog switch 14 is performed by a controller, not shown but of the usual nature, and as a result of the feedback control, a predetermined output characteristic, such as a constant voltage (CV) output or a constant current (CC) output, is provided for the DC output on the secondary side. While the AC adaptor 10 is being driven, the analog switch 14 on the primary side is repetitively turned on and off to control the output, and the consumption of extra power occurs due to the switching loss that was hereinbefore described in the Background Art. The analog switch 14 is, for example, an FET switch. The ACiDC transformation mechanism of the AC adaptor 10 may be either a current resonant type or a flyback type.

In addition to the AC/DC transformation mechanism, the AC adaptor in this embodiment includes a switch 20 for halting the supply of a current to the primary side of the transformer 12, and a control block 30 for turning on or off the switch 20. It should be fully understood that, since a current does not flow to the primary side coil of the transformer 12 while the switch 20 is off, the switching loss incurred due to the FET switch 14 is eliminated and the loss of power can be restricted.

The control block 30 comprises a control transformer 31, a comparator 32 and a primary-secondary isolator 33. AC 100 V supplied via the AC outlet is branched and input to the primary side of the control transformer 31. The control transformer 31 has a low output and serves as an auxiliary power source. On the secondary side of the control transformer 31, a paired diode 35 and capacitor 36 rectifies and smooths the output, and a signal of DC 20 V is generated. The voltage level of 20 V is not required for the implementation of the present invention; however, the voltage level should be sufficiently higher than 16 V, the output level of the adaptor 10.

The output terminal of the control transformer 31 is connected via a resistor 37 to the 16 V output terminal of the AC adaptor 10 and also to one of the terminals of the comparator 32. When, in the power-OFF state of the electronic apparatus 50 or during the charging of a battery 55, the current output by the control transformer 31 that flows from the output terminal of the AC adaptor 10 exceeds the permissible level, the resistor 37 reduces a voltage at the output terminal of the AC adaptor 10. The resistance of the resistor 37 is set, for example, to 1 kΩ. Because of the existence of the resistor 37, the output of the control transformer 31 is used only for the control of the switch 20, which will be described later, and the loss of power can be avoided.

The comparator 33 compares a voltage output by the AC adaptor 10 with the reference voltage. The reference voltage level is set higher than 16 V, which is the output voltage during the normal operation of the AC adaptor, and lower than 20 V, which is a voltage output by the control transformer 31. In this embodiment, 18 V is set as the reference voltage.

When the output terminal of the AC adaptor 10 continues to be connected to the system load in the electronic apparatus 50, an electric charge is pulled in by the system load, and as a result, a voltage of 16 V, which is the output by the transformer 12, appears at the output terminal of the system load. When the output terminal of the AC adaptor 10 is detached from the system load, i.e., is opened, a voltage of 20 V, which is the output by the control transformer 31, appears at the output terminal. Therefore, the comparator 32 determines whether the voltage at one input terminal is higher than the reference voltage of 18 V, which is the voltage at the other input terminal, to ascertain whether the voltage output by the AC adaptor 10 is being used for driving the electronic apparatus 50 or whether the output terminal of the AC adaptor is connected to the electronic apparatus 50.

The output of the comparator 32 is used for controlling the ON/OFF state of the switch 20. To electrically isolate a signal to the secondary side from a signal to the primary side, the output of the comparator 32 controls the switch 20 via the primary-secondary isolator 33. The primary-secondary isolator 33 may be, for example, a photo coupler, which is well known in the art.

When the voltage at one input terminal is lower than 18 V, i.e., when the output of the AC adaptor 10 is currently being consumed by the electronic apparatus 50, the comparator 32 outputs a signal to turn on the switch 20. Since, as a result, the current input via the AC outlet is supplied to the transformer 12, the AC adaptor 10 can generate a voltage. When the voltage at one input terminal is higher than 18 V, i.e., when the output of the AC adaptor 10 is not being consumed by the electronic apparatus 50, the comparator 32 outputs a signal to turn off the switch 20. Since, as a result, the current input via the AC outlet is not supplied to the transformer 12, the AC adaptor 10 falls into the operation halted state. Accordingly, the switching loss due to the FET switch 14 is restricted. It should be noted that the switch 20 is, for example, an FET switch.

Figure 2:
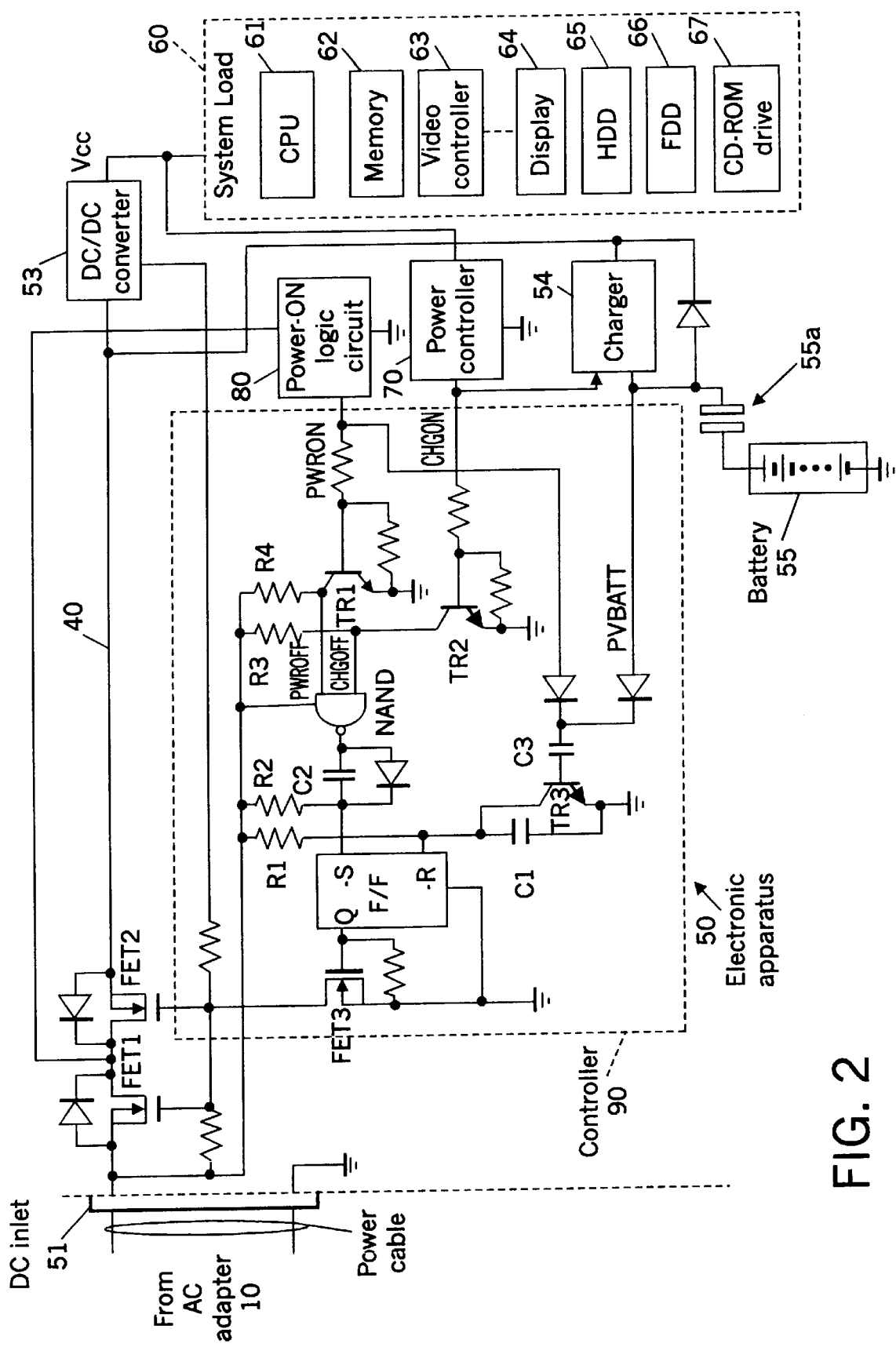
FIG. 2 is a diagram illustrating the hardware block diagram of an electronic apparatus 50 to which an AC adaptor 10 according to the present invention can be attached, and in particular, showing a power supplying system.

In FIG. 2 is shown the hardware block diagram of the electronic apparatus 50 to which the AC adaptor 10 of the present invention can be attached. In particular, the power supplying system is shown. The electronic apparatus 50 is a battery-operated, and is, for example, a notebook computer. The individual sections will now be described while referring to FIG. 2.

The electronic apparatus 50 receives a 16 VDC voltage from the AC adaptor 10 via a DC inlet 51 that is formed in the wall of the apparatus 50. A power line 40 is connected to a DC/DC converter 53 via a pair of FET switches FET1 and FET2. The FET switches FET1 and FET2 are so connected that cathode terminals of parasitic diodes face each other. When both FET switches are turned off, the bidirectional supply of a current across the power line 40 can be halted. In this embodiment, the switches FET1 and FET2 are a Nch type.

The DC/DC converter 53 receives, in parallel, an output terminal voltage from the battery 55, which is incorporated in the apparatus 50. The battery 55 generally is a battery pack that consists of a plurality of rechargeable battery cells, such as Li-ion or NiMH cells. The input terminal of a charger 54 is connected to the power line 40, and the output terminal is connected to the terminal of the battery 55. The charger 54 is a circuit for employing extra power produced by the AC adaptor 10 when the power to the apparatus 50 is off in order to generate a charge current for the battery 55. The initiation and halting of the charging is controlled by a power controller 70, which will be described later.

The DC/DC converter 53 converts a DC voltage of 16 V supplied by the AC adaptor 10 to a voltage level (DC 5 V in this embodiment) appropriate for driving the system, and stably outputs the voltage. The output voltage is supplied to the individual sections of a system load 60. The system load 60 comprises various peripheral controller chips, including a CPU 61, a main memory 62 and a video controller 63; a display 64 as an output device; and a hard disk drive (HDD) 65, a floppy disk drive (FDD) 66 and a CD-ROM drive 67, all of which are external storage devices. The DC/DC converter 53 is driven by an input voltage $V_{CC}$ received from the AC adaptor 10.

The CPU 61 is a main controller for controlling the operation of the electronic apparatus 50 under the control of an operating system (OS), and employs the main memory 62 as a work area. Necessary program code and data are loaded as needed from an external storage device, such as the hard disk drive (HDD) 65, into the main memory 62. The controlling of the operation of the peripheral devices is controlled by each peripheral controller. For example, the drawing process on the display 64 is controlled by the video controller 63, and the input/output of data for a modem and a printer are controlled by an I/O controller (not shown). The display 64 of the notebook PC is, generally, a liquid crystal display (LCD), which is a thin and light, and consumes only a small amount of power.

The electronic apparatus 50 has in addition a power controller 70 and a power-ON logic circuit 80 to implement the operation for supplying power to the apparatus 50 and for halting the supply of power. The power controller 70 is a dedicated controller for controlling the power supplying system in the electronic apparatus 50. The power controller 70 includes, for example, (1) a function for monitoring the operation of the apparatus 50 and power consumption, and (2) a function for constantly monitoring the remaining power capacity of the battery 55 and for initiating and halting the charging operation performed by the charger 54. The power controller 70 includes input terminals (not shown) for measuring the terminal voltage of the battery 55, the amount of a current that flows in and out and the ambient temperature of the battery cell, and can ascertain the charged state of the battery 55. In addition, during the charging period, the power controller 70 asserts a charge-ON (CHGON) signal to drive the charger 54. When the charging is terminated, the power controller 70 negates the charge-ON (CHGON) signal. A one-chip microprocessor "H8," produced by Hitachi Ltd., can program such an operation as that performed by the power controller 70.

In response to a user's manipulation of a power switch 59, which is formed on the wall of the electronic apparatus 50, the power-ON logic circuit 80 performs the power ON/OFF operation for the electronic apparatus 50. When the power to the apparatus 50 is on, the power-ON logic circuit 80 asserts a power-ON (PWRON) signal, and when the power to the apparatus 50 is off, the power-ON logic circuit 80 negates the power-ON (PWRON) signal. The power controller 70 is driven at the output voltage $V_{CC5}$ roduced by the DC/DC converter 53, while the power-ON logic circuit 80 is driven at the input voltage $V_{CC}$ received from the AC adaptor 10.

Figure 3:
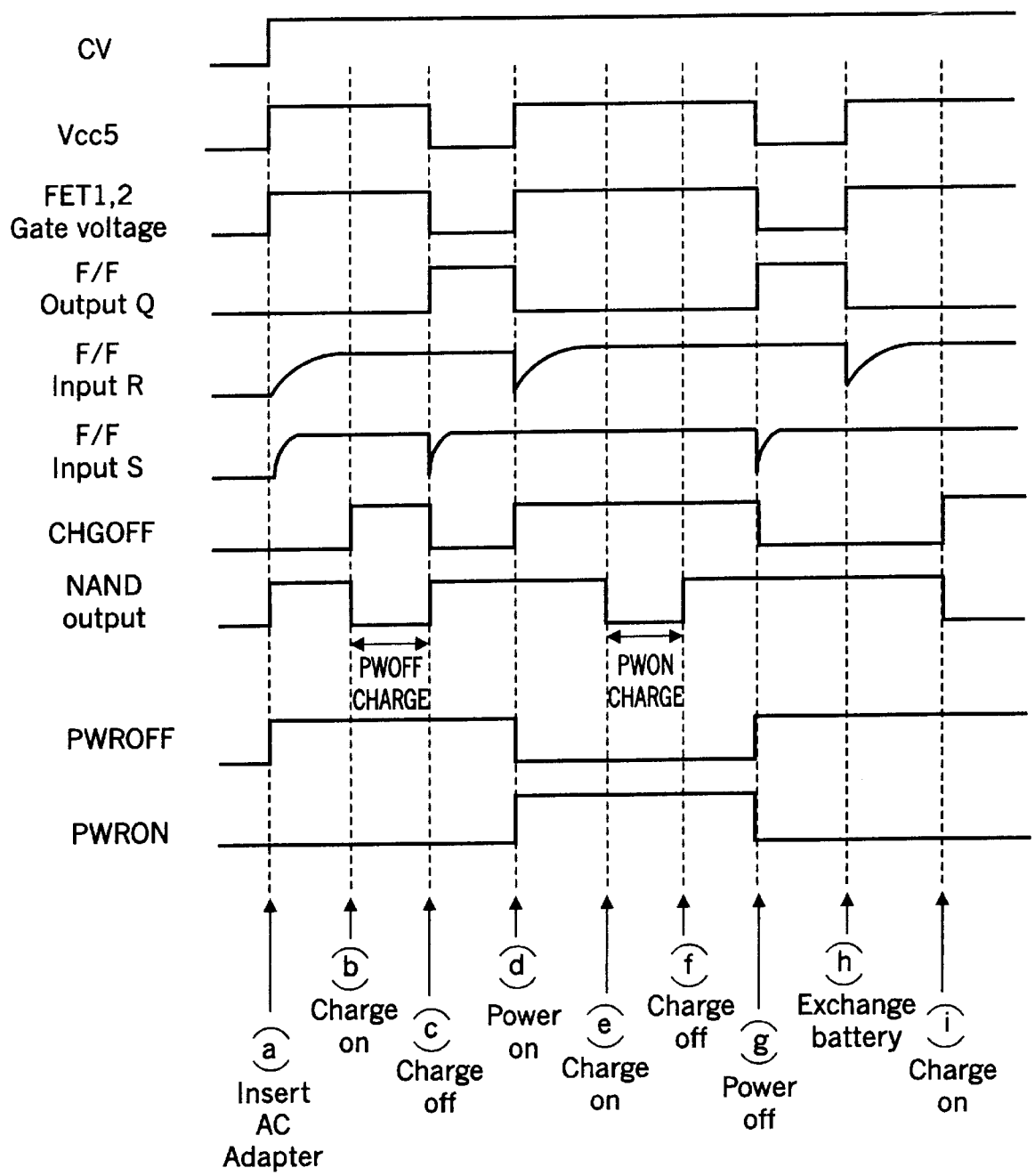
FIG. 3 is a timing chart showing operating characteristics accompanied by control procedures performed by a controller 90.

In this embodiment, when the supply of power from the AC adaptor 10 is not required, the electronic apparatus 50 detaches the power line 40 from the DC inlet 51, so that the consumption of extra power by the system load 60 can be prevented, even when the AC adaptor 10 is attached to the apparatus 50. When the supply of power from the AC adaptor 10 is not required is the time at which the power to the apparatus 50 is off and the charging of the battery 55 is terminated. The disconnection of the power line 40 from the DC inlet 51 is accomplished by turning off the switches FET1 and FET2, as is described above. A controller 90 enclosed by the broken line in FIG. 2 is mounted in order to implement the ON/OFF control of the switches FET1 and FET2. The individual elements in the controller 90 are driven at an input voltage $V_{CC}$ received from the AC adaptor 10. FIG. 3 is a timing chart showing the operating characteristics of the controller 90. The functions of the controller 90 will now be described while referring to FIG. 3.

(a) Insertion of AC Adaptor

Assume that the AC adaptor 10 is attached to the DC inlet 51 of the apparatus 50 while the power to the apparatus 50 is off. A voltage output by the AC adaptor 10 is applied to the power line 40. The voltage output by the AC adaptor 10 is a DC voltage of 16 V generated by the transformer 12. In response to the start of the supply of power by the AC adaptor 10, a pulse wave generated by the interaction of a resistor R1 and a capacitor C1 is input to a reset terminal R of a flip-flop F/F in the controller 90, while a pulse wave generated by the interaction of a resistor R2 and a capacitor C2 is input to a set terminal S of the flip/flop F/F. In this embodiment, parameters for resistances and capacities are so set that the leading edge of the pulse wave at the reset terminal R is delayed. Therefore, the resetting of the flip-flop F/F is performed first, and the output Q of the flip-flop F/F is maintained at low. The low output Q is transmitted to the gate of an Nch FET switch FET3, which is then turned off, and the gates of the switches FET1 and FET2 are detached from the ground and go high, so that the switches FET1 and FET2 are set to the ON state. In other words, the power line 40 is connected. In response to the ON states of the FET switches, the DC/DC converter 53 is driven and begins to output a 5V DC voltage $V_{CC5}$.

(b) Initiation of Charging

The power controller 70 measures the time for starting the charging process. The power controller 70 constantly monitors the remaining power and the terminal voltage of the battery 55, or the ambient temperature of the battery cell, and detects a charging start time when the remaining power or the terminal voltage, or the ambient temperature falls below a predetermined value which is a well known factor. When the charging start time is detected while the AC adaptor 10 is attached, the power controller 70 asserts its output signal CHGON. The signal CHGON is transmitted to the charger 54 to drive it. In addition, the CHGON signal is inverted by a transistor TR2, and the inverted signal is transmitted as a low-level CHGOFF signal to one of the terminals of a NAND gate. At this time, the electronic apparatus 50 is in the OFF state, and the power-ON logic circuit 80 continues the negation of its output signal PWRON. The PWRON signal is inverted by a transistor TR1, and the inverted high-level PWROFF signal is transmitted to the other terminal of the NAND gate. Therefore, at the same time the charging is begun while the power to the apparatus 50 is off, the output of the NAND gate is changed from low to high. Since the output of the NAND gate does not affect the input of S to the flip-flop F/F, the ON states of the switches FET1 and FET2 are maintained. In other words, the supply of charging power from the AC adaptor 10 is ensured.

(c) Termination of Charging

The power controller 70 measures the time for the completion of the charging process. The power controller 70 constantly monitors the power accumulated and the terminal voltage of the battery 55, or the ambient temperature of the battery cell, and detects a charging end time when the power accumulated or the terminal voltage, or the ambient temperature exceeds a predetermined value, a well known factor. When the charging end time is detected while the AC adaptor 10 is attached, the power controller 70 negates its output signal CHGON. The signal CHGON is transmitted to the charger 54 to halt the charging operation. Further, the CHGON signal is inverted by the transistor TR2, and the inverted high-level CHGOFF signal is transmitted to one of the terminals of the NAND gate. At this time, the electronic apparatus 50 is in the OFF state, and the power-ON logic circuit 80 continues negation of its output signal PWRON. The PWRON signal is inverted by the transistor TR1, and the inverted high-level PWROFF signal is transmitted to the other terminal of the NAND gate. Therefore, at the same time the charging is terminated while the power to the apparatus 50 is off, the output of the NAND gate is changed from high to low. Due to the trailing edge of the NAND output, a pulse wave is generated by the interaction of the resistor R2 and the capacitor C2 and is transmitted to the set terminal S of the flip-flip F/F. As a result, the internal state of the flip-flop F/F is shifted and its output Q is changed to high. Thus, a high voltage is applied to the gate of the switch FET3, which is then turned on. The gates of the switches FET1 and FET2 fall to the ground level, and the switches FET1 and FET2 are turned off. In other words, the power line 40 is detached from the DC inlet 51.

(d) Power ON

The power-ON operation is initiated by, for example, the manipulation of a power-ON switch 81 formed on the wall of the case of the electronic apparatus 50. In response to the manipulation of the power-ON switch 81, the power-ON logic circuit 80 begins a predetermined power-ON operation sequence, and asserts its output signal PWRON. The PWRON signal is transmitted via a capacitor C3 to the base of a transistor TR3, and a pulse wave is generated at the collector of the transistor TR3. The pulse wave is transmitted to the reset terminal R of the flip-flop F/F, which changes its output Q to low. Since the low output Q is transmitted to the gate of the Nch switch FET3, the FET3 detaches the gates of the switches FET1 and FET2 from the ground and drives them to high, so that the switches FET1 and FET2 are turned on. In short, the connection of the power line 40 is established. In response to the ON states of the FET switches, the DC/DC converter 53 is driven to begin to output a 5V DC voltage $V_{CC5}$.

(e) Initiation of Charging in Power ON State

The power controller 70 measures the time for starting the charging process. The power controller 70 constantly monitors the power remaining and the terminal voltage of the battery 55, or the ambient temperature of the battery cell, and detects the charge start time when the remaining power or the terminal voltage, or the ambient temperature falls below a predetermined value (well known). When the charging start time is detected while the power to the apparatus 50 is on, the power controller 70 asserts its output signal CHGON. The signal CHGON is transmitted to the charger 54 to drive it. In addition, the CHGON signal is inverted by the transistor TR2, and the inverted signal is transmitted as a low CHGOFF signal to one of the terminals of the NAND gate. At this time, the electronic apparatus 50 is in the ON state, and the powerON logic circuit 80 continues the assertion of its output signal PWRON. The PWRON signal is inverted by the transistor TR1, and the inverted low PWROFF signal is transmitted to the other terminal of the NAND gate. Therefore, even when the charging is begun while the power to the apparatus 50 is on, the output of the NAND gate is maintained at high and thus does not affect the input of S to the flip-flop F/F, and the ON states of the switches FET1 and FET2 can be maintained. In other words, the connection of the power line 40 is maintained, and the supply of charging power from the AC adaptor 10 is ensured.

(f) Termination of Charging in Power ON State

The power controller 70 measures the time for completion of the charging process. The power controller 70 constantly monitors the power accumulated and the terminal voltage of the battery 55, or the ambient temperature of the battery cell, and detects a charging start time when the power accumulated or the terminal voltage, or the ambient temperature exceeds a predetermined value, as before stated to be well known. When the charging end time is detected while the power to the apparatus 50 is on, the power controller 70 negates its output signal CHGON. The signal CHGON is transmitted to the charger 54 to halt the charge operation. In addition, the CHGON signal is inverted by the transistor TR2, and the inverted high CHGOFF signal is transmitted to one of the terminals of the NAND gate. At this time, the electronic apparatus 50 is in the ON state, and the power-ON logic circuit 80 continues assertion of its output signal PWRON. The PWRON signal is inverted by the transistor TR1, and the inverted low PWROFF signal is transmitted to the other terminal of the NAND gate. Therefore, at the same time the charging is terminated while the power to the apparatus 50 is on, the output of the NAND gate is maintained high and does not affect the input of S to the flip-flop F/F, and the ON states of the switches FET1 and FET2 are maintained. In other words, the connection of the power line 40 is maintained, and the supply of charging power from the AC adaptor 10 is ensured.

(g) Power OFF

The power-OFF operation is initiated by, for example, manipulating a power-ON switch 81 formed on the wall of the case of the electronic apparatus 50. In response to the manipulation of the power-ON switch 81, the power-ON logic circuit 80 begins a predetermined power-OFF operation sequence, and negates its output signal PWRON. The PWRON signal is inverted by the transistor TR1, and the inverted high PWROFF signal is transmitted to one of the terminals of the NAND gage. Since the charging of the battery 55 is terminated at this time, the power controller 70 negates its output signal CHGON, and a high CHGOFF signal is transmitted to the other terminal of the NAND gate. In response to the power-OFF operation, the NAND gate changes its output from high to low. Due to the trailing edge of the NAND output, a pulse wave is generated by the interaction of the resistor R2 and the capacitor C2, and is transmitted to the set terminal S of the flip-flip F/F. As a result, the internal state of the flip-flop F/F is shifted and its output Q is changed to high. Thus, a high voltage is applied to the gate of the switch FET3, which is then turned on. The gates of the switches FET1 and FET2 fall to the ground level, and the switches FET1 and FET2 are turned off. In other words, the power line 40 is detached from the DC inlet 51.

(h) Battery Exchange

The period during which the power to the apparatus 50 is off is a desirable time for a user to exchange the battery 55. At the moment a new battery 55 is loaded, a battery terminal voltage (PVBATT) is applied to an output terminal 55a, and accordingly, a voltage is applied via the capacitor C3 to the base of the transistor TR3 to generate a pulse wave at the collector of the transistor TR3. The pulse wave is transmitted to the reset terminal R of the flip-flop F/F, which changes its output Q to low. When the low output Q is transmitted to the gate of the Nch FET switch FET3, since the FET3 detaches the gates of the switches FET1 and FET2 from the ground to high, the FET3 turns on the switches FET1 and FET2. In short, the connection of the power line 40 is established. In response to the ON status of the FET switches, the DC/DC converter 53 is activated to begin to output the 5V DC voltage $V_{CC5}$. Upon the exchange of a battery, generally, a charging process should be performed for a new battery 55. In this embodiment, the connection of the power line 40 is ensured at the battery exchange, so that the charging process can be performed.

(I) Initiation of Charging

The power controller 70 measures the time for starting the charging process. The power controller 70 constantly monitors the power remaining and the terminal voltage of the battery 55, or the ambient temperature of the battery cell, and detects a charging start time when the power remaining or the terminal voltage, or the ambient temperature falls below a predetermined value. When the charging start time is detected while the power to the apparatus 50 is off, the power controller 70 asserts its output signal CHGON. The signal CHGON is transmitted to the charger 54 to drive it. In addition, the CHGON signal is inverted by the transistor TR2, and the inverted low CHGOFF signal is transmitted to one of the terminals of the NAND gate. At this time, the electronic apparatus 50 is in the OFF state, and the power-ON logic circuit 80 continues the negation of its output signal PWRON. The PWRON signal is inverted by the transistor TR1, and the inverted high PWROFF signal is transmitted to the other terminal of the NAND gate. Therefore, at the same time the charging is begun while the power to the apparatus 50 is off, the output of the NAND gate is changed from low to high. Since the output of the NAND gate does not affect the input of S to the flip-flop F/F, the ON states of the switches FET1 and FET2 are maintained. In other words, the supply of charging power from the AC adaptor 10 is ensured.

In the above description, in a period during which the electronic apparatus 50 does not require the supply of power, more specifically, in a period such as the phase (c) or (g) during which the power to the apparatus 50 is off and the charging has been terminated, the power line 40 is detached by the switches FET1 and FET2. The ON/OFF control of the switches FET1 and FET2 is performed based on the voltage received from the AC adaptor 10 applied to the DC inlet 51. In other words, the electric charges accumulated in the battery 55 of the apparatus 50 are not consumed by the switching control.

Although many electric circuits other than those shown in FIG. 1 are required to construct the AC adaptor 10 and the electronic apparatus 50, which is a computer system, they are well known to one having ordinary skill in the art. And as they are not directly related to the subject of the present invention, no explanation for them will be given. Further, it should be noted that, to avoid making the drawings too complex, only one part of the connections between the hardware blocks in the drawings is shown.

B. Operating Characteristics of AC Adaptor

Power saving characteristics of the AC adaptor 10 according to this embodiment will now be described. As was previously described, a conventional AC adaptor continues to consume power as long as it is attached to an AC outlet. It will be apparent from the following explanation, however, that the AC adaptor 10 in this embodiment does not substantially consume power unless the electronic apparatus 50 attached thereto requires power. An explanation will now be given while referring to FIG. 1 again.

(a) When an AC adaptor 10 is connected to an AC outlet but is not connected to an electronic apparatus:

since a current flows in the transformer 12 when the AC adaptor 10 is connected to the AC outlet, power may be consumed by the ON/OFF control of the FET switch 14.

When the AC adaptor 10 is not connected to the electronic apparatus 50 however, the output terminal (the DC outlet 13) of the AC adaptor 10 is in the open state.

Whereas, not only a voltage output by the power supply transformer 12 but also a voltage output by the control transformer 31 is applied to the output terminal of the AC adaptor 10, in the open state of the output terminal, a higher voltage of 20 V is output by the transformer 31. As a result, the output of the comparator 32 is asserted, and the switch 20 is turned off via the primary-secondary isolator 33. As a result, no current flows in the transformer 12, and the consumption of power by the ON/OFF control of the FET switch 14 can be avoided.

(b) When an AC adaptor 10 is connected to both an AC outlet and an electronic apparatus:

when the AC adaptor 10 is continuously connected to the electronic apparatus 50, power may be consumed by the system load of the apparatus 50 even if the power to the apparatus 50 is off.

In this embodiment, however, when the power to the electronic apparatus 50 is off and the charging has been terminated, the power line 40 is disconnected by the FET switches FET1 and FET2 as previously described. Specifically, in a period during which the apparatus 50 does not require power, the output terminal (the DC outlet 13) of the AC adaptor 10 is in the open state.

Whereas, not only a voltage output by the power supply transformer 12 but also a voltage output by the control transformer 31 is applied to the output terminal of the AC adaptor 10, in the open state of the output terminal, a higher voltage of 20 V is output by the transformer 31. As a result, the output of the comparator 32 is asserted, and the switch 20 is turned off via the primary-secondary isolator 33. As a result, no current flows in the transformer 12, and the consumption of power by the ON/OFF control of the FET switch 14 can be avoided.

The present invention has been described in detail while referring to a specific embodiment. However, it should be obvious to one having ordinary skill in the art that various modifications or revisions of the embodiment are possible within the scope of the present invention. The present invention can be applied, for example, for facsimile machines, various cordless devices, such as mobile radio terminals, cordless telephones, personal digital assistants and video cameras, various battery-operated electric/electronic devices, such as word processors, and electric/electronic devices to be driven by AC power via an AC adaptor. That is, although the present invention has been disclosed by using an example, it should not be limited to that example. To fully understand the subject of the present invention, the claims should be referred to.

What is claimed:

1. An AC adaptor independent of and for connecting to an electronic apparatus having a load operable by a DC voltage, comprising:

a first connector for directly connecting to an external AC voltage source, said first connector receiving alternating current from said external AC voltage source;

means for generating a DC voltage;

a second connection for connecting to the electronic apparatus by an input line for supplying the DC voltage for operation of the load of the electronic apparatus;

means included as a part of the AC adaptor for determining whether the load of the electronic apparatus requires a DC voltage for operation of the load of the electronic apparatus; and means included as a part of the AC adaptor for automatically disconnecting the means for generating the DC voltage of the AC adaptor from the external AC voltage source when the load of the electronic apparatus does not require power from the AC adaptor power source to operate.

2. The AC adaptor as defined in claim 1, wherein the means for automatically disconnecting the means for generating the DC voltage of the AC adaptor from the external AC voltage source when the load of the electronic apparatus does not require power from the AC adaptor power source to operate, also provides for automatically disconnecting the means for generating the DC voltage of the AC adaptor from the external AC voltage source when the load of the electronic apparatus does not require power from a battery utilized as an alternate power source of DC voltage to the load of the electronic apparatus.

3. The AC adaptor as defined in claim 2, wherein the means for automatically disconnecting the means for generating the DC voltage of the AC adaptor from the external AC voltage source when the load of the electronic apparatus does not require power includes comparator means for determining that the electronic apparatus does not require power.

4. The AC adaptor as defined in claim 3, further including a charging controller for controlling a charged state of the alternate DC power source battery; and wherein the means for automatically disconnecting the means for generating the DC voltage of the AC adaptor from the external AC voltage source when the load of the electronic apparatus does not require power, includes means for monitoring the connective state of the power source AC adaptor to the external AC voltage source and the recharged state of the alternate DC power source battery and for automatically disconnecting the AC adaptor power source from the AC power source when the electronic apparatus does not require power and when the alternate DC power source battery is not to be recharged.

5. The AC adaptor as defined in claim 4, wherein the means for monitoring the connective state of the power source AC adaptor to the external AC voltage source and the recharged state of the battery and for automatically disconnecting the AC adaptor power source from the AC power source when the electronic apparatus does not require power and when the alternate DC power source battery is not to be recharged, includes a connection to the AC voltage source which is used to generate the DC voltage for operation of the load of the electronic apparatus.

* * * * *